(12) United States Patent
Ji et al.

(10) Patent No.: US 12,378,118 B2
(45) Date of Patent: Aug. 5, 2025

(54) CARBON NANOTUBE (CNT)-BASED THREE-DIMENSIONAL ORDERED MACROPOROUS (3DOM) CARBON MATERIAL AND PREPARATION METHOD THEREOF

(71) Applicant: Tianjin University, Tianjin (CN)

(72) Inventors: Kemeng Ji, Tianjin (CN); Jiang Wang, Tianjin (CN); Zhaozhao Liu, Tianjin (CN); Xinyu Liu, Tianjin (CN); Mengqian Wu, Tianjin (CN); Minjie Zhu, Tianjin (CN); Mingming Chen, Tianjin (CN); Chengyang Wang, Tianjin (CN); Shuai Liu, Tianjin (CN); Xiaohui Du, Tianjin (CN)

(73) Assignee: Tianjin University, Tianjin (CN)

( * ) Notice: Subject to any disclaimer, the term of this patent is extended or adjusted under 35 U.S.C. 154(b) by 521 days.

(21) Appl. No.: 17/806,167

(22) Filed: Jun. 9, 2022

(65) Prior Publication Data

US 2023/0073650 A1 Mar. 9, 2023

(30) Foreign Application Priority Data

Jun. 11, 2021 (CN) .......................... 202110658668.5

(51) Int. Cl.
*C01B 32/16* (2017.01)
*B01J 20/20* (2006.01)
*B82Y 30/00* (2011.01)
*B82Y 40/00* (2011.01)

(52) U.S. Cl.
CPC ............. *C01B 32/16* (2017.08); *B01J 20/205* (2013.01); *B82Y 30/00* (2013.01); *B82Y 40/00* (2013.01); *C01B 2202/20* (2013.01)

(58) Field of Classification Search
CPC ................................. C01B 32/16; B01J 20/205
See application file for complete search history.

(56) References Cited

U.S. PATENT DOCUMENTS

2020/0168893 A1* 5/2020 Yan ........................ H01M 4/13

* cited by examiner

*Primary Examiner* — Stuart L Hendrickson
(74) *Attorney, Agent, or Firm* — Stanek Lemon Crouse & Meeks, PA

(57) ABSTRACT

Disclosed are a carbon nanotube (CNT)-based three-dimensional ordered macroporous (3DOM) carbon material and a preparation method thereof. The CNT-based 3DOM carbon material comprises a honeycomb network structure having a 3DOM structure formed by overlapping CNTs, wherein ordered macropores each have a diameter of 270 nm to 360 nm, and the CNTs each have an outer diameter of 8 nm to 20 nm.

7 Claims, 7 Drawing Sheets

CARBON NANOTUBE (CNT)-BASED THREE-DIMENSIONAL ORDERED MACROPOROUS (3DOM) CARBON MATERIAL AND PREPARATION METHOD THEREOF

CROSS REFERENCE TO RELATED APPLICATION

This patent application claims the benefit and priority of Chinese Patent Application No. 202110658668.5, entitled "Carbon nanotube (CNT)-based three-dimensional ordered macroporous (3DOM) carbon material and preparation method thereof" filed on Jun. 11, 2021, the disclosure of which is incorporated by reference herein in its entirety as part of the present application.

TECHNICAL FIELD

The present disclosure relates to a carbon nanotube (CNT)-based three-dimensional ordered macroporous (3DOM) carbon material and a preparation method thereof, belonging to the technical field of carbon materials.

BACKGROUND ART

Porous materials are widely used in energy conversion and storage, catalysis, sensing and many other fields due to large specific surface area, high pore volume, and topological properties thereof. In addition to large specific surface area, porous carbon materials have excellent electrical conductivity and structural stability, and thus have become a basis for the construction of various nanocomposites. In recent years, many novel nanoporous carbon materials, such as CNTs, ordered mesoporous carbon, 3DOM carbon, and hierarchical porous carbon, have been successfully prepared and showed excellent use values. In addition to the general characteristics of common porous carbon materials, such as large specific surface area and high electrical conductivity, 3DOM carbon materials have strong periodic pore structure arrangement, uniform pore size, as well as a three-dimensional and ordered overall structure. Therefore, the 3DOM carbon materials have broad prospects for use in the fields of catalyst supports, electrode materials, and adsorption and purification. Controllable synthesis and efficient assembly of nanomaterials are the premise and guarantee for practical use. So far, no literature or patent has reported a nanoporous carbon material with a one-dimensional CNT structure and a 3DOM structure and a preparation method thereof.

SUMMARY

An object of the present disclosure is to provide a CNT-based 3DOM carbon material (which is a CNTs aggregation material) and a preparation method thereof. The preparation method has a simple process, is low in cost, and could synthesize a nanoporous carbon material with a one-dimensional CNT structural unit and a 3DOM structure, which has a regular and organized macrostructure.

The present disclosure provides a CNT-based 3DOM carbon material, including a honeycomb network structure having a 3DOM-structure formed by overlapping CNTs, where ordered macropores each have a diameter of 270 nm to 360 nm, and the CNTs each have an outer diameter of 8 nm to 20 nm.

In some embodiments, the carbon material is a composite of carbon and other substances, wherein the carbon refers to pure carbon, and the carbon material is compounded by carbon and nickel.

The present disclosure further provides a method for preparing the CNT-based 3DOM carbon material, including:

step 1, dissolving solid powders of nickel nitrate and citric acid in deionized water to obtain a dissolved solution, stirring the dissolved solution to be uniform to obtain a precursor solution; immersing a template based on regularly-arranged polymethyl methacrylate (PMMA) microspheres in the precursor solution to obtain a template immersed solution, and filtering the template immersed solution under vacuum to obtain a filter cake, and drying the filter cake at ambient temperature to obtain a precursor; and step 2, placing the precursor obtained in step 1 in a tubular furnace, and subjecting the precursor to a calcination for carbonization under atmospheric pressure and in an inert gas, to obtain the CNT-based 3DOM carbon material.

In the present disclosure, during the calcination, PMMA in the precursor is pyrolysed in-situ to obtain a hydrocarbon vapor, which serves as a carbon source for CNT growth.

In some embodiments, a molar ratio of the nickel nitrate to the citric acid is 2:1; and concentrations of the nickel nitrate and the citric acid are adjusted as required, for example, the nickel nitrate has a concentration of 2 mol/L, and the citric acid has a concentration of 1 mol/L.

In some embodiments, the immersing is conducted at ambient temperature for 4 h.

In some embodiments, the inert gas is argon. In some embodiments, the calcination for carbonization is conducted under atmospheric pressure at a calcination temperature of 450° C. to 1,000° C. for 60 min with a heating rate of 10° C./min from ambient temperature to the calcination temperature, followed by conducting natural cooling. In some embodiments, the calcination is conducted at 450° C., 600° C., or 1,000° C. It is found that with an increase of the calcination temperature, a metallic nickel component in the precursor has enhanced crystallinity and a nanoparticle size is increased. In addition, the metallic nickel component is easily removed by etching with an acidic reagent according to requirements for use, to obtain a CNT-based 3DOM carbon material without nickel.

The method according to the present disclosure has the following beneficial effects:

In the present disclosure, in the method for preparing the CNT-based 3DOM carbon material, a nanoporous carbon material with a one-dimensional CNT structure and a 3DOM structure could be obtained through simple operations such as immersing and calcination in an inert gas. The nanoporous carbon material has a three-dimensional bicontinuous honeycomb network structure, with a uniformly-distributed pore size and a highly-organized arrangement. These morphological and structural features provide a basis for subsequent multifunctional use of the material.

The physical properties such as crystal structure, morphology, and chemical composition of the CNT-based 3DOM carbon material are determined using instruments such as a D8-Focus X-ray diffractometer (XRD), a Regulus 8100 scanning electron microscope (SEM), a JEMF200 high-resolution electron transmission electron microscope (TEM), and a LabRam HR Evolution Raman spectrometer (Raman).

BRIEF DESCRIPTION OF THE DRAWINGS

In order to more clearly illustrate the technical solutions in the embodiments of the present disclosure, a brief introduction to the accompanying drawings required for the embodiments will be provided below.

DETAILED DESCRIPTION OF THE EMBODIMENTS

The present disclosure will be further described below in conjunction with specific examples, but the present disclosure is not limited to the following examples.

Example 1

Figure 1A:
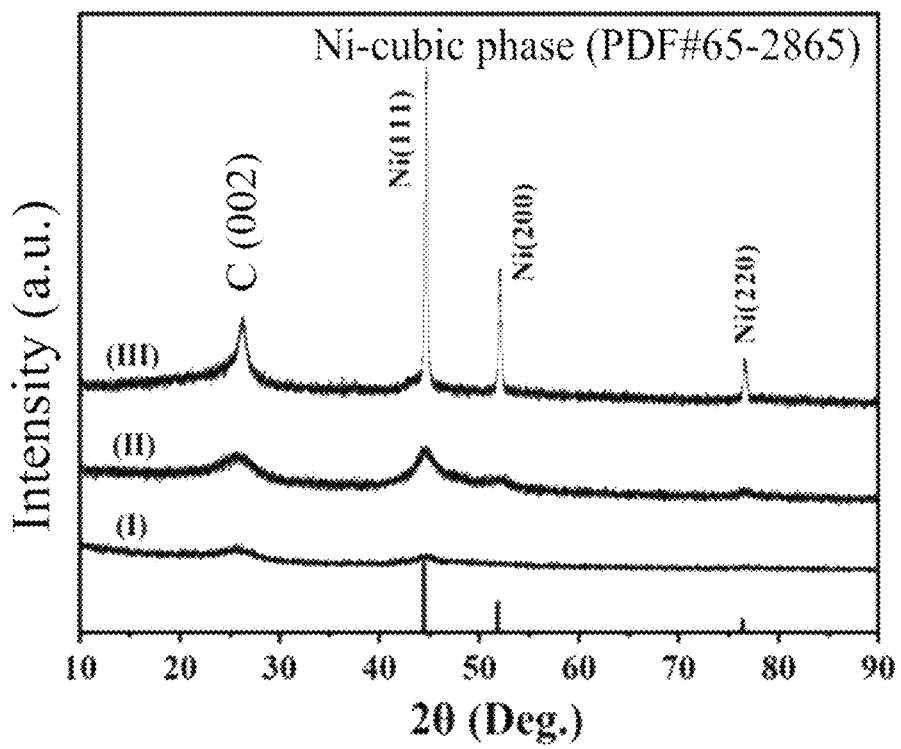
FIG. 1A shows an XRD pattern of the CNT-based 3DOM carbon materials prepared under different calcination temperatures in Example 1 to 3; where (I to III) correspond to samples prepared at temperatures of 450° C., 600° C., and 1,000° C., respectively.
Figure 1B:
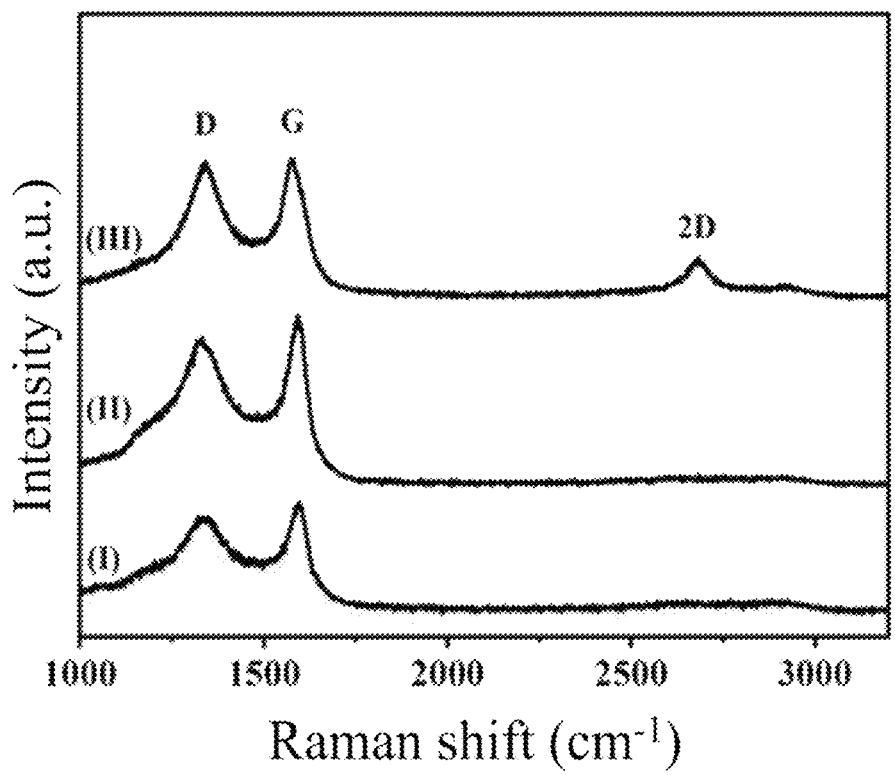
FIG. 1B shows a Raman pattern of the CNT-based 3DOM carbon materials prepared under different calcination temperatures in Example 1 to 3; where (I to III) correspond to samples prepared at temperatures of 450° C., 600° C., and 1,000° C., respectively.
Figure 2A:
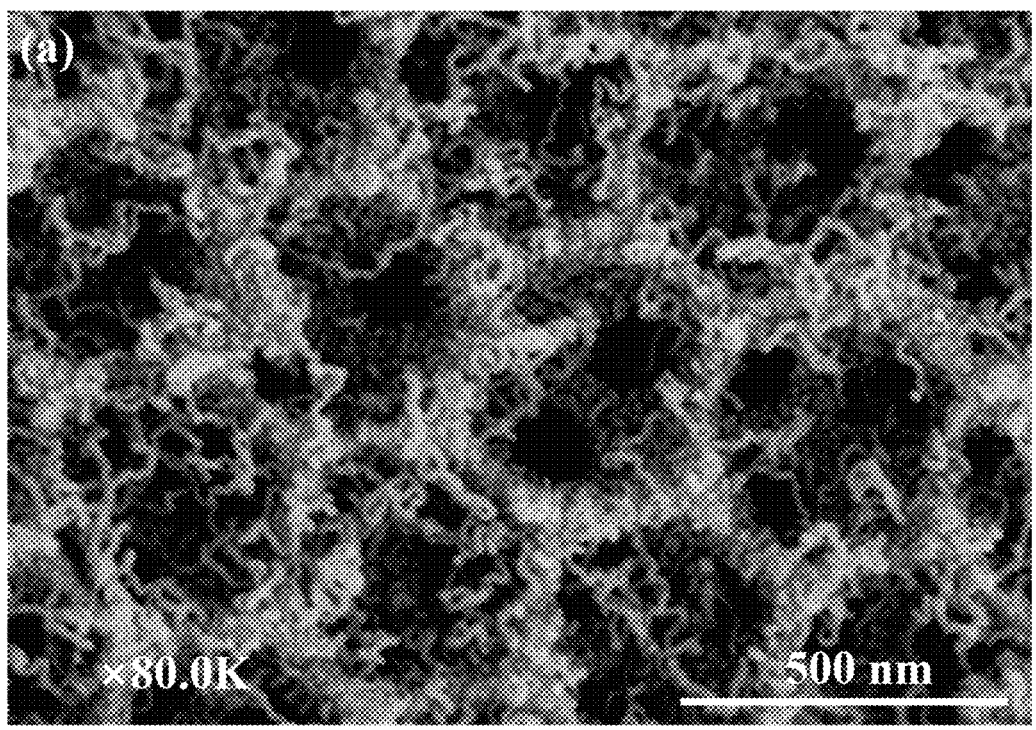
FIGS. 2A-2C show SEM images of the CNT-based 3DOM carbon material prepared at 450° C. in Example 1.
Figure 2B:
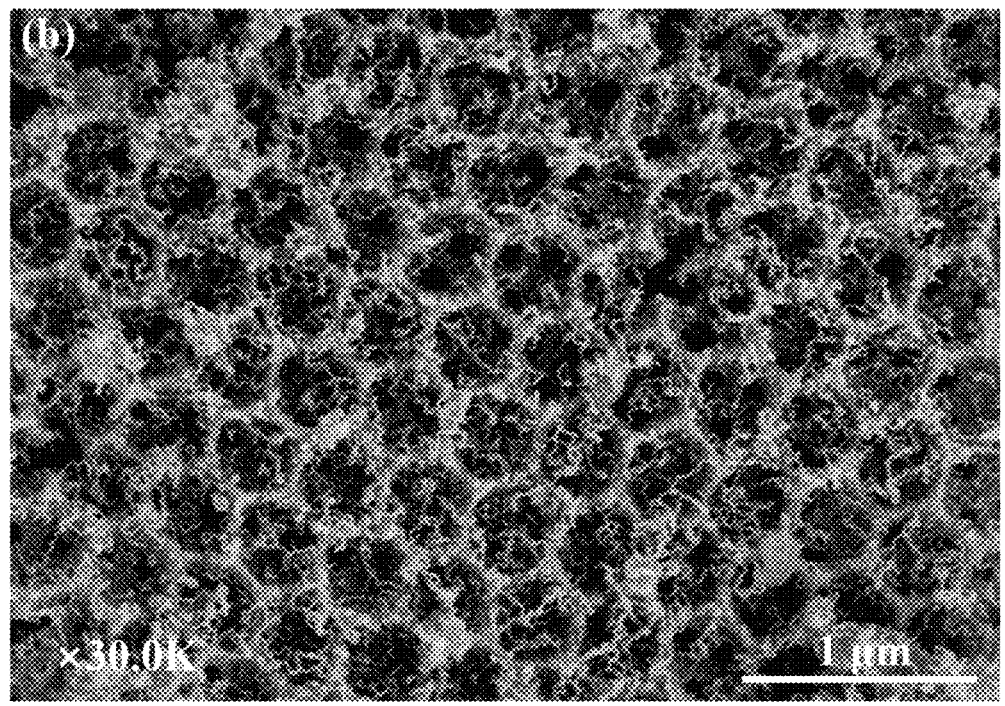
Figure 2C:
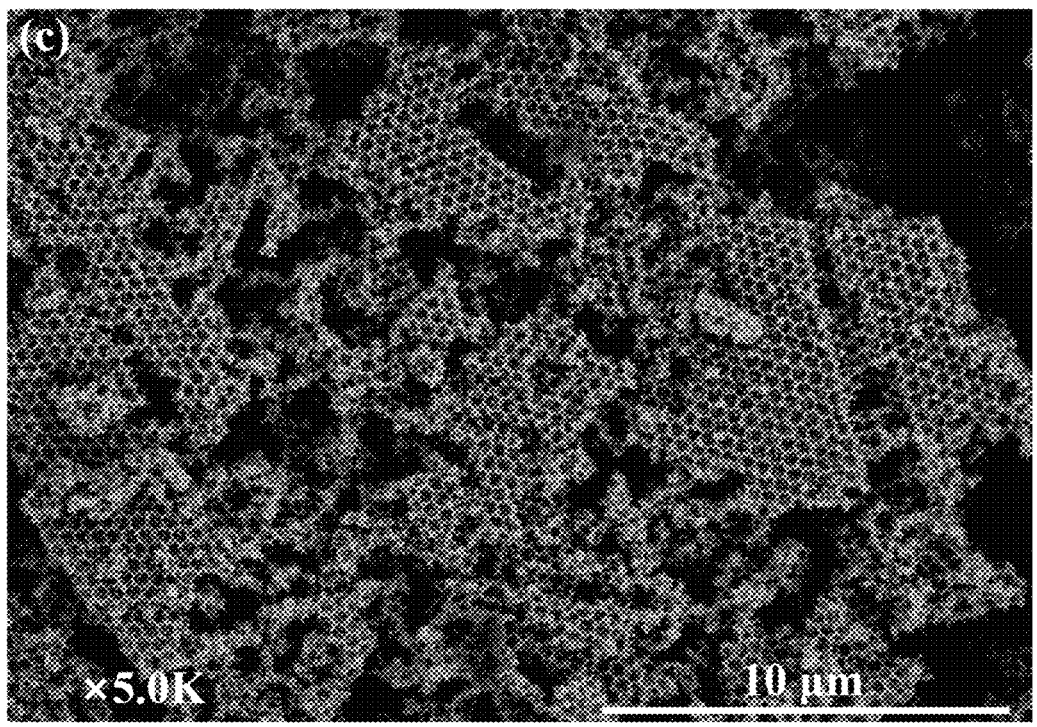
Figure 2D:
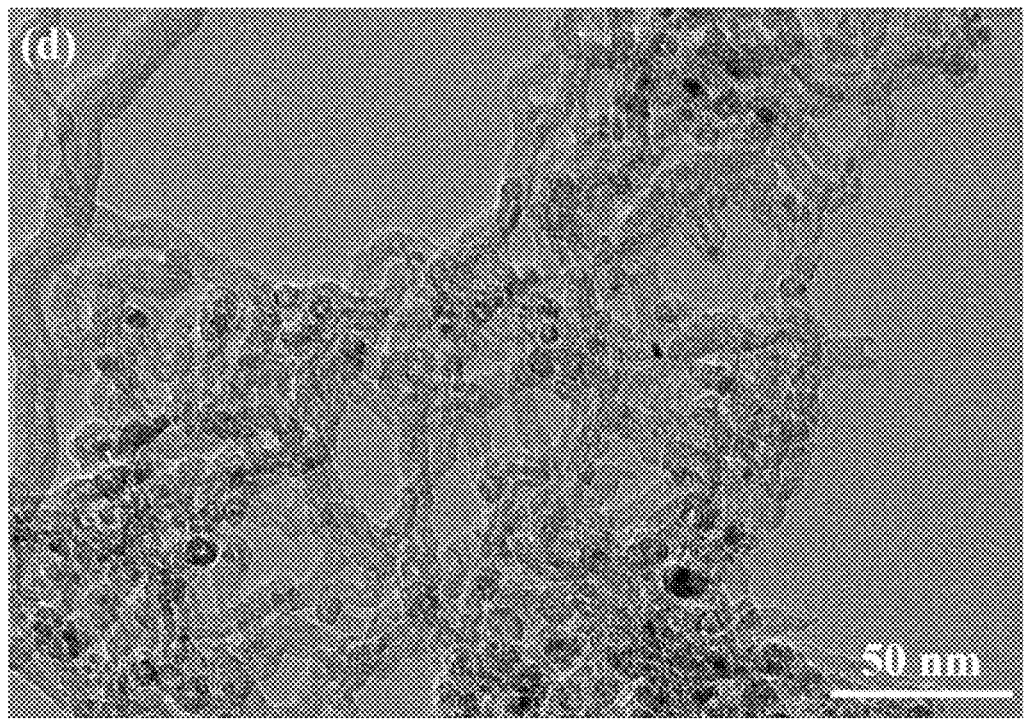
FIGS. 2D-2F show TEM images of the CNT-based 3DOM carbon material prepared at 450° C. in Example 1.
Figure 2E:
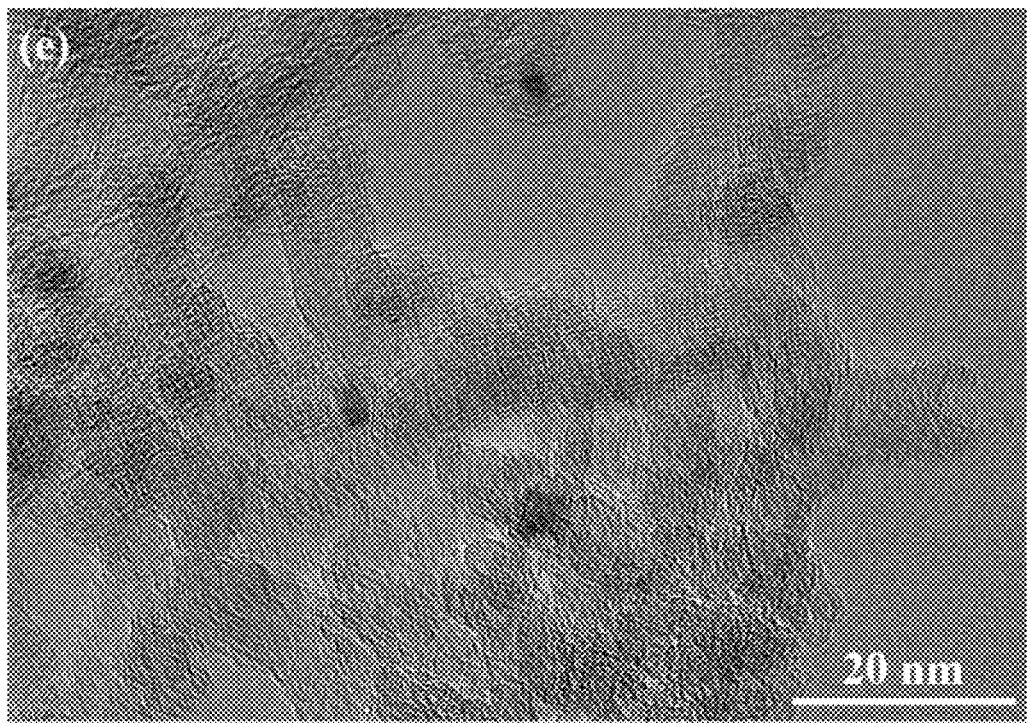
Figure 2F:
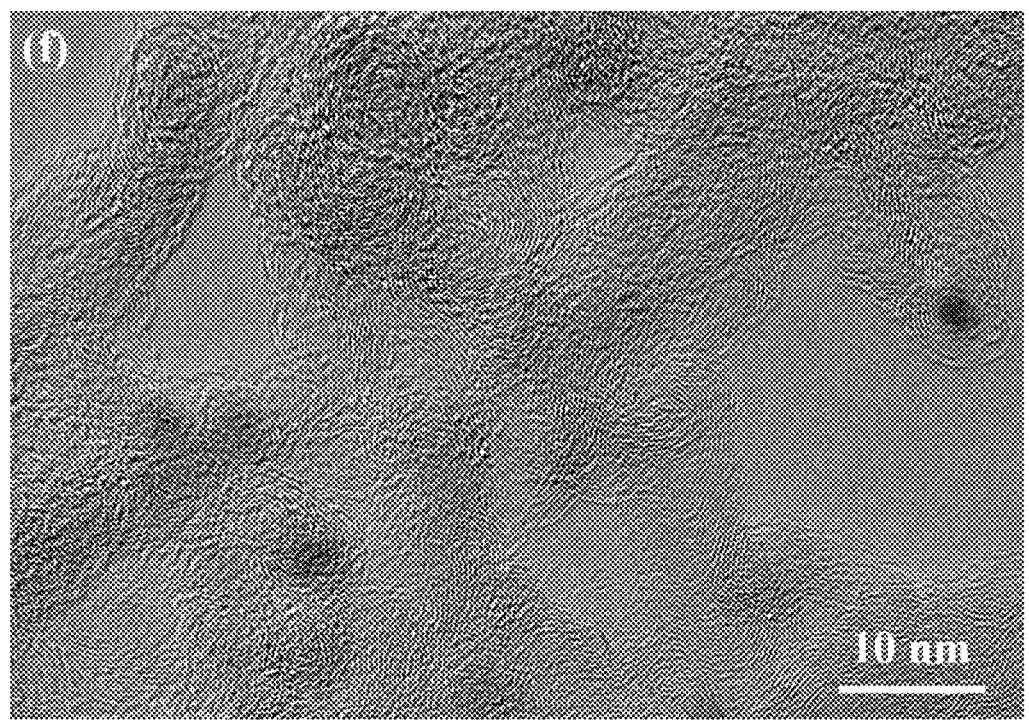
Figure 2G:
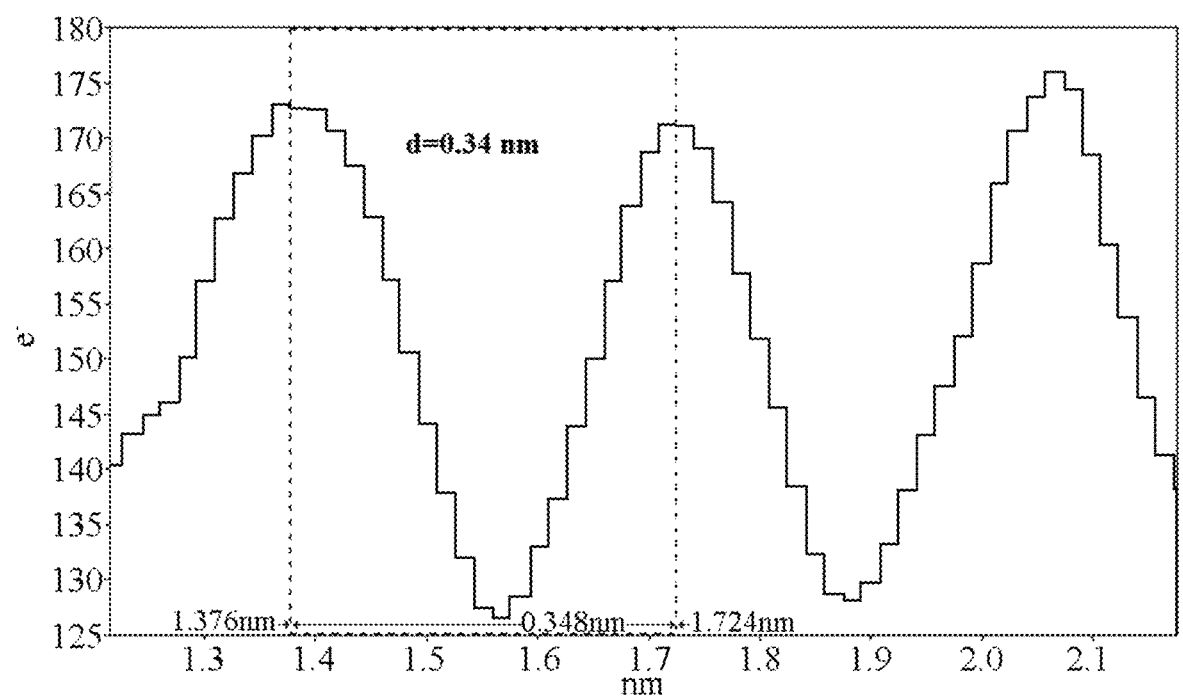
FIG. 2G shows interlayer spacing of the CNT-based 3DOM carbon material prepared at 450° C. in Example 1.

A PMMA microsphere template was immersed in a mixed solution including 2 mol/L $Ni(NO_3)_2.6H_2O$, 1 mol/L citric acid and deionized water for 4 h to obtain a template immersed solution. The template immersed solution was filtered under vacuum to obtain a filter cake. The filter cake was naturally dried to obtain a solid. The solid was placed in argon with a flow rate of 200 sccm, heated to 450° C. at a heating rate of 10° C./min from ambient temperature, and calcined at 450° C. for 60 min as shown in FIGS. 1A and 1B. The calcined solid was naturally cooled to ambient temperature, obtaining a 3DOM carbon material assembled by CNTs and metallic nickel nanocrystals. Specifically, the material had a 3DOM structure, and a pore wall thereof was interwoven by a large number of one-dimensional CNTs packaged with single Ni nanocrystals; Ni had a grain size of 2 nm to 3 nm, and graphitized carbon had an interlayer spacing of 0.34 nm; the 3DOM structure had a primary pore size and a secondary pore size (a diameter of a macropore and a size of a window between the interconnected macropores) of 340 nm to 360 nm and 100 nm to 140 nm, respectively; the nanotube had an outer diameter of 8 nm to 20 nm and an inner diameter of 2 nm to 5 nm. FIGS. 2A-2C show SEM images of the CNT-based 3DOM carbon material prepared at 450° C. in Example 1. FIGS. 2D-2F show TEM images of the CNT-based 3DOM carbon material prepared at 450° C. in Example 1. FIG. 2G shows interlayer spacing of the CNT-based 3DOM carbon material prepared at 450° C. in Example 1.

Example 2

Figure 3A:
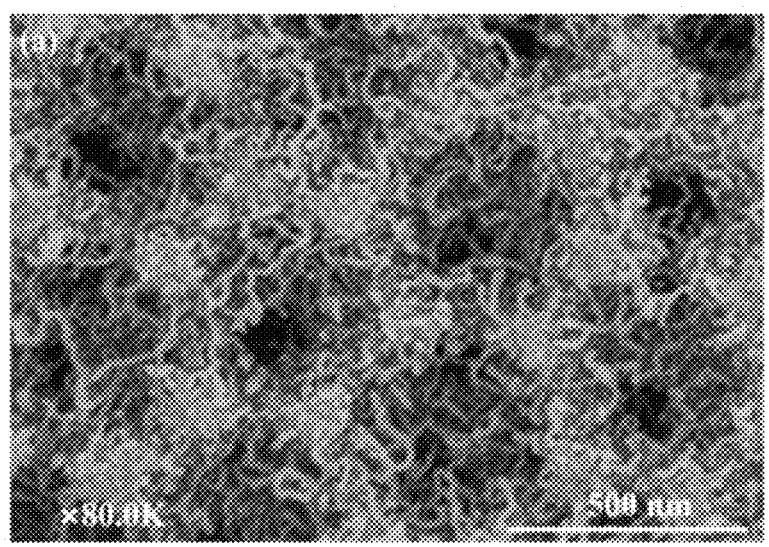
FIGS. 3A-3C show SEM images of the CNT-based 3DOM carbon material prepared at 600° C. in Example 2.
Figure 3B:
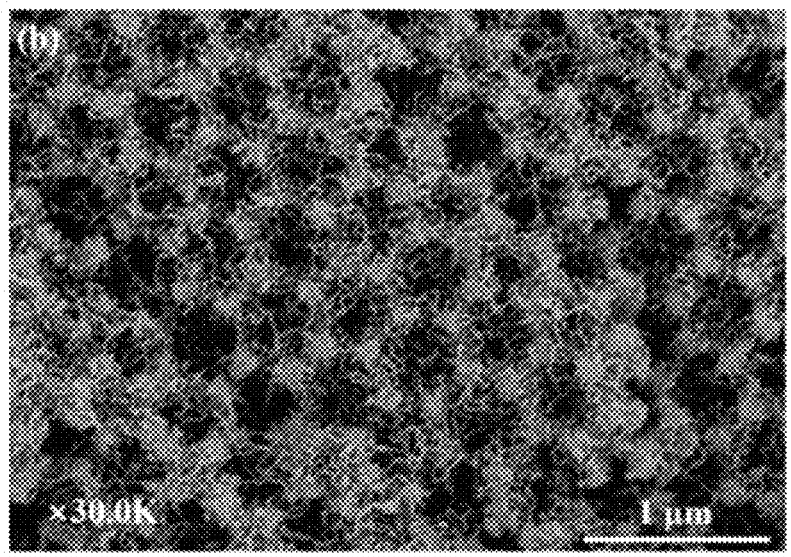
Figure 3C:
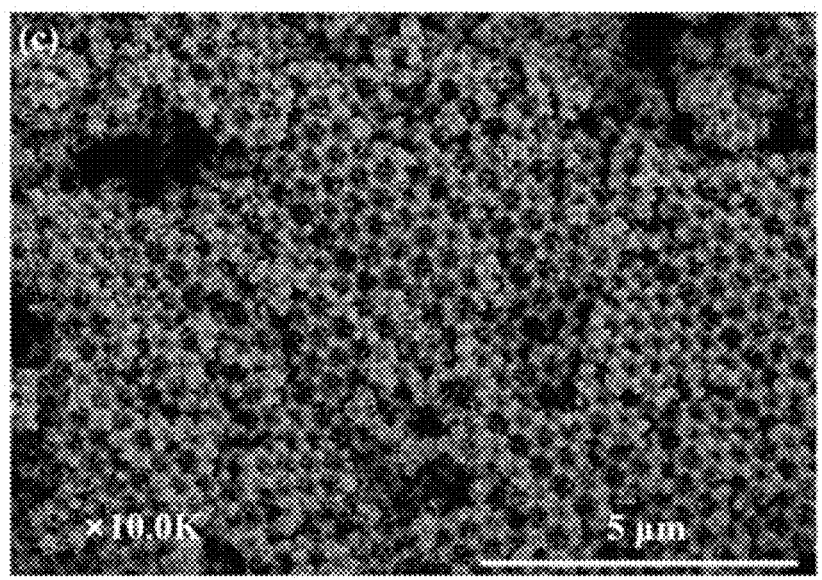

A PMMA microsphere template was immersed in a mixed solution including 2 mol/L $Ni(NO_3)_2.6H_2O$, 1 mol/L citric acid and deionized water for 4 h to obtain a template immersed solution. The template immersed solution was filtered under vacuum to obtain a filter cake. The filter cake was naturally dried to obtain a solid. The solid was placed in argon with a flow rate of 200 sccm, heated to 600° C. at a heating rate of 10° C./min from ambient temperature, and calcined at 600° C. for 60 min. The calcined solid was naturally cooled to ambient temperature, obtaining a 3DOM carbon material assembled by CNTs and metallic nickel nanocrystals. Specifically, the material had a 3DOM structure, and a pore wall thereof was woven by a large number of one-dimensional CNTs packaged with single Ni nanocrystals; Ni had a grain size of 3 nm to 4 nm, and graphitized carbon had an interlayer spacing of 0.34 nm; the 3DOM structure had a primary pore size and a secondary pore size of 270 nm to 330 nm and 100 nm to 140 nm, respectively; the nanotube had a diameter of 8 nm to 20 nm. FIGS. 3A-3C show SEM images of the CNT-based 3DOM carbon material prepared at 600° C. in Example 2.

Example 3

Figure 4A:
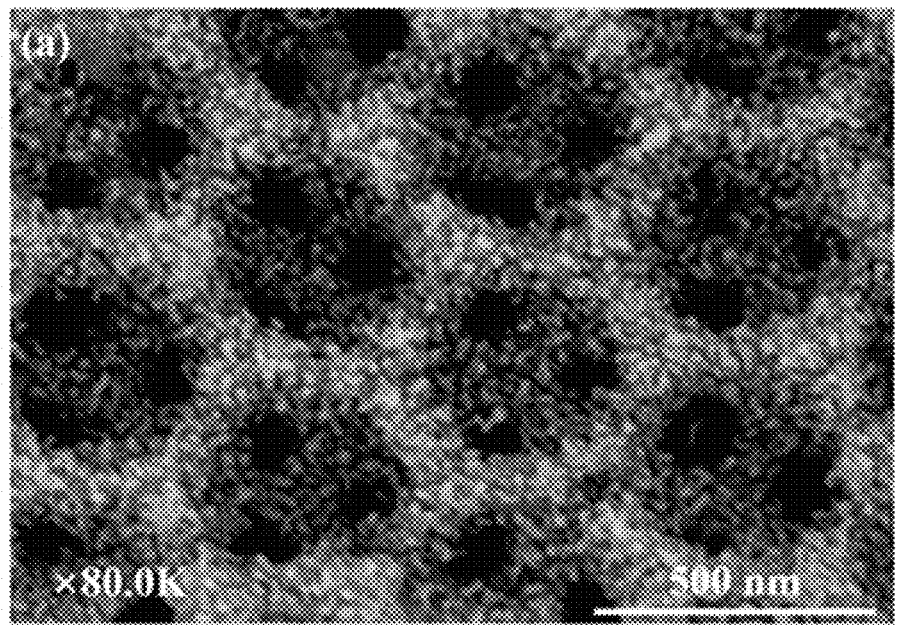
FIGS. 4A-4B show SEM images of the CNT-based 3DOM carbon material prepared at 1,000° C. in Example 3.
Figure 4B:
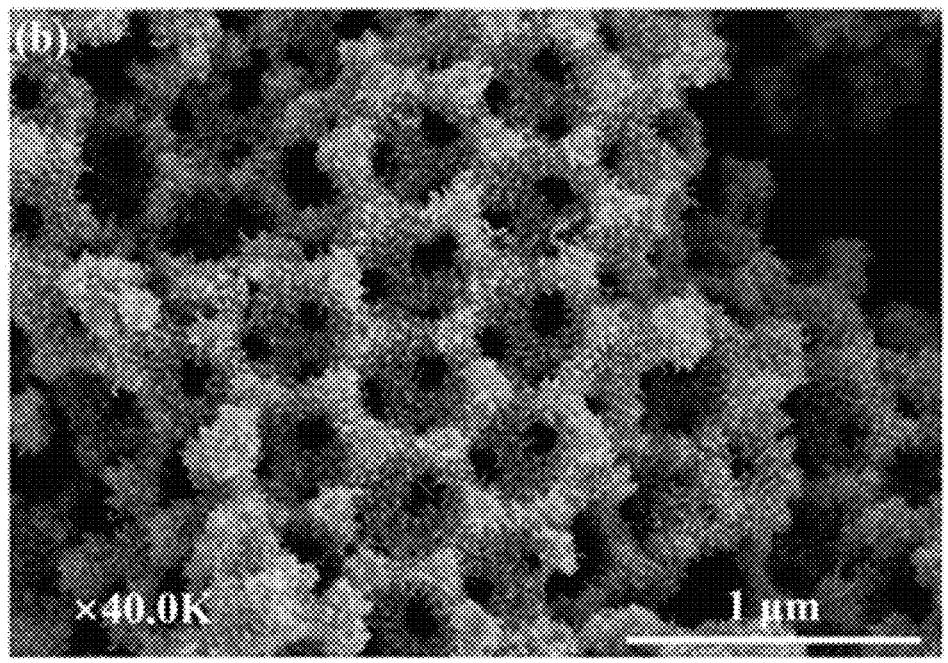

A PMMA microsphere template was immersed in a mixed solution including 2 mol/L $Ni(NO_3)_2.6H_2O$, 1 mol/L citric acid and deionized water for 4 h to obtain a template immersed solution. The template immersed solution was filtered under vacuum to obtain a filter cake. The filter cake was naturally dried to obtain a solid. The solid was placed in argon with a flow rate of 200 sccm, heated to 1,000° C. at a heating rate of 10° C./min from ambient temperature, and calcined at 1000° C. for 60 min. The calcined solid was naturally cooled to ambient temperature, obtaining a 3DOM carbon material assembled by CNTs and metallic nickel nanocrystals. Specifically, the material had a 3DOM structure, and a pore wall thereof was woven by a large number of one-dimensional CNTs packaged with single Ni nanocrystals; Ni had a grain size of 22 nm to 27 nm, and graphitized carbon had an interlayer spacing of 0.34 nm, and the nanotubes on a surface were approximately fluffy; the 3DOM structure had a primary pore size and a secondary pore size of 320 nm to 350 nm and 100 nm to 140 nm, respectively. FIGS. 4A-4B show SEM images of the CNT-based 3DOM carbon material prepared at 1,000° C. in Example 3.

What is claimed is:

1. A carbon nanotube (CNT)-based three-dimensional ordered macroporous (3DOM) carbon material, comprising a honeycomb network structure having a 3DOM structure formed by overlapping a plurality of CNTs, wherein macropores each have a diameter of 270 nm to 360 nm, and the plurality of CNTs each have an outer diameter of 8 nm to 20 nm.

2. The CNT-based 3DOM carbon material of claim 1, wherein the CNT-based 3DOM carbon material is a composite of pure graphitic carbon and metallic nickel nanocrystals.

3. A method for preparing the CNT-based 3DOM carbon material of claim 1, comprising:
   step 1, dissolving solid powders of nickel nitrate and citric acid in deionized water to obtain a dissolved solution, and stirring the dissolved solution to be uniform to obtain a precursor solution; immersing a template based on regularly-arranged polymethyl methacrylate (PMMA) microspheres in the precursor solution to obtain a template immersed solution, and filtering the template immersed solution under vacuum to obtain a filter cake, and drying the filter cake at ambient temperature to obtain a precursor; and step 2, placing the precursor obtained in step 1 in a tubular furnace, and subjecting the precursor to calcination for carbonization under atmospheric pressure and in an inert gas, to obtain the CNT based 3DOM carbon material.

4. The method of claim 3, wherein a molar ratio of the nickel nitrate to the citric acid is 2:1.

5. The method of claim 3, wherein the nickel nitrate has a concentration of 2 mol/L, and the citric acid has a concentration of 1 mol/L.

6. The method of claim 3, wherein the immersing is conducted at ambient temperature for 4 h.

7. The method of claim 3, wherein the inert gas is argon; and the calcination for carbonization is conducted under atmospheric pressure at a calcination temperature of 450° C. to 1,000° C. for 60 min with a heating rate of 10° C./min from ambient temperature to the calcination temperature, followed by conducting passive cooling.

\* \* \* \* \*